US009063701B2

(12) United States Patent
Lai et al.

(10) Patent No.: US 9,063,701 B2
(45) Date of Patent: Jun. 23, 2015

(54) HANDHELD OPERATION DEVICE

(71) Applicant: Cooler Master Co., Ltd., New Taipei (TW)

(72) Inventors: Yi-Hsien Lai, New Taipei (TW); Carter Williams Salley, New Taipei (TW); Lung-Yuan Chen, New Taipei (TW); Jhih-Wei Rao, New Taipei (TW); Shih-Yi Chang, New Taipei (TW)

(73) Assignee: COOLER MASTER DEVELOPMENT CORPORATION, Zhonghe Dist., New Taipei (TW)

( * ) Notice: Subject to any disclaimer, the term of this patent is extended or adjusted under 35 U.S.C. 154(b) by 317 days.

(21) Appl. No.: 13/854,119

(22) Filed: Mar. 31, 2013

(65) Prior Publication Data
US 2014/0290426 A1 Oct. 2, 2014

(51) Int. Cl.
*G06F 3/0354* (2013.01)
*G06F 1/16* (2006.01)

(52) U.S. Cl.
CPC ......... *G06F 1/1656* (2013.01); *Y10T 74/20732* (2015.01); *G06F 3/03541* (2013.01)

(58) Field of Classification Search
CPC ... G06F 3/03543; G06F 3/038; G06F 3/0362; G06F 3/0383; G06F 3/0312; G06F 2203/0333
See application file for complete search history.

(56) References Cited

U.S. PATENT DOCUMENTS

| 5,973,671 | A  | * | 10/1999 | Kuo .............................. 345/157 |
| 8,111,242 | B1 | * | 2/2012 | Charlton et al. .............. 345/163 |
| 8,334,843 | B1 | * | 12/2012 | Charlton et al. .............. 345/163 |
| 2008/0055250 | A1 | * | 3/2008 | Chang ........................... 345/163 |

* cited by examiner

*Primary Examiner* — Kevin Nguyen
(74) *Attorney, Agent, or Firm* — Winston Hsu; Scott Margo

(57) ABSTRACT

A handheld operation device includes a casing, a plurality of counterweight blocks and a counterweight module. The counterweight module is disposed on the casing. The counterweight module includes a base and a block plate. The block plate covers the base. One of the base and the block plate is capable of rotating with respect to the casing. The base has a plurality of accommodating recesses. The block plate has a broken hole formed thereon. One of the accommodating recesses is exposed in the broken hole such that one of the counterweight blocks is capable of passing through the broken hole and then being disposed in the accommodating recess.

7 Claims, 4 Drawing Sheets

HANDHELD OPERATION DEVICE

BACKGROUND OF THE INVENTION

1. Field of the Invention

The invention relates to a handheld operation device and, more particularly, to a handheld operation device capable of changing a weight and a center-of-gravity position thereof by the cooperation between a plurality of counterweight blocks and a counterweight module.

2. Description of the Prior Art

As technology advanced and developed, various handheld operation devices (e.g. mouse, joystick, mobile phone, personal digital assistant, flat computer, etc.) have been widely used in daily life. Since a user always holds the handheld operation device on hand(s) to perform operation, a weight and a center-of-gravity position of the handheld operation device will affect an operation feeling of the user. In general, the weight and the center-of-gravity position of the handheld operation device are fixed such that the user cannot change the weight and the center-of-gravity position of the handheld operation device according to his/her using habit. Accordingly, the user will be persecuted on choosing and purchasing the handheld operation device.

SUMMARY OF THE INVENTION

The invention provides a handheld operation device capable of changing a weight and a center-of-gravity position thereof by the cooperation between a plurality of counterweight blocks and a counterweight module, so as to solve the aforesaid problems.

According to an embodiment of the invention, a handheld operation device of the invention comprises a casing, a plurality of counterweight blocks and a counterweight module. The counterweight module is disposed on the casing. The counterweight module comprises a base and a block plate. The block plate covers the base. One of the base and the block plate is capable of rotating with respect to the casing. The base has a plurality of accommodating recesses. The block plate has a broken hole formed thereon. One of the accommodating recesses is exposed in the broken hole such that one of the counterweight blocks is capable of passing through the broken hole and then being disposed in the accommodating recess.

As mentioned in the above, the invention installs the counterweight module on the casing of the handheld operation device such that a user can place/take the counterweight block into/out of the accommodating recess of the base via the broken hole of the block plate, so as to change the weight and the center-of-gravity position of the handheld operation device. Furthermore, the user can rotate the base or the block plate to place more counterweight blocks into more accommodating recesses correspondingly, so as to increase the weight of the handheld operation device and further change the center-of-gravity position of the handheld operation device. Accordingly, the user can change the weight and the center-of-gravity position of the handheld operation device according to his/her using habit by the cooperation between the counterweight blocks and the counterweight module.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
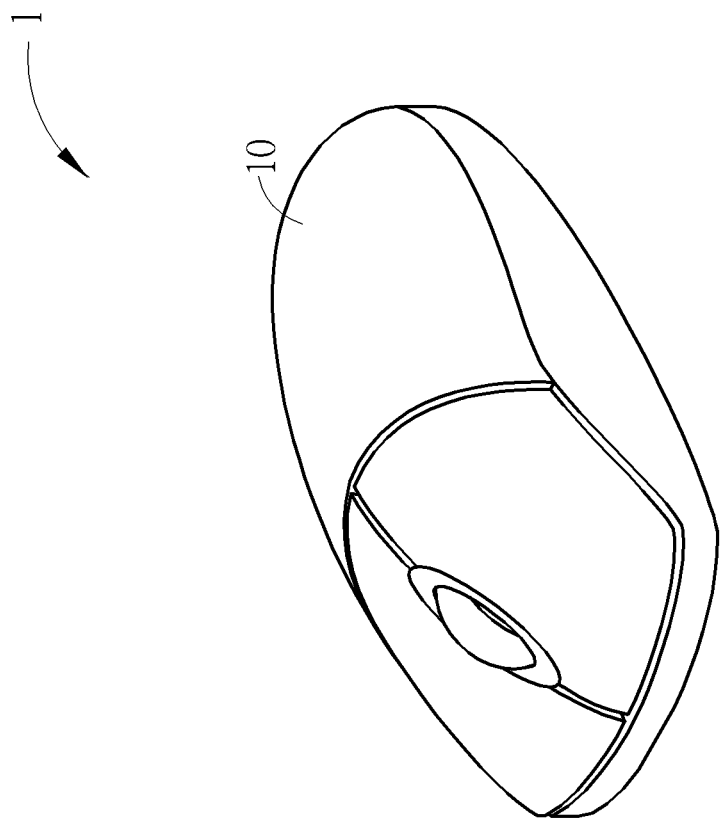
FIG. 1 is a schematic diagram illustrating a handheld operation device according to a first embodiment of the invention.
Figure 1:
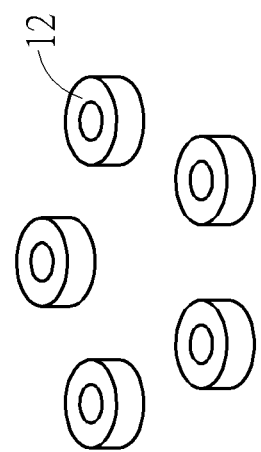
Figure 2:
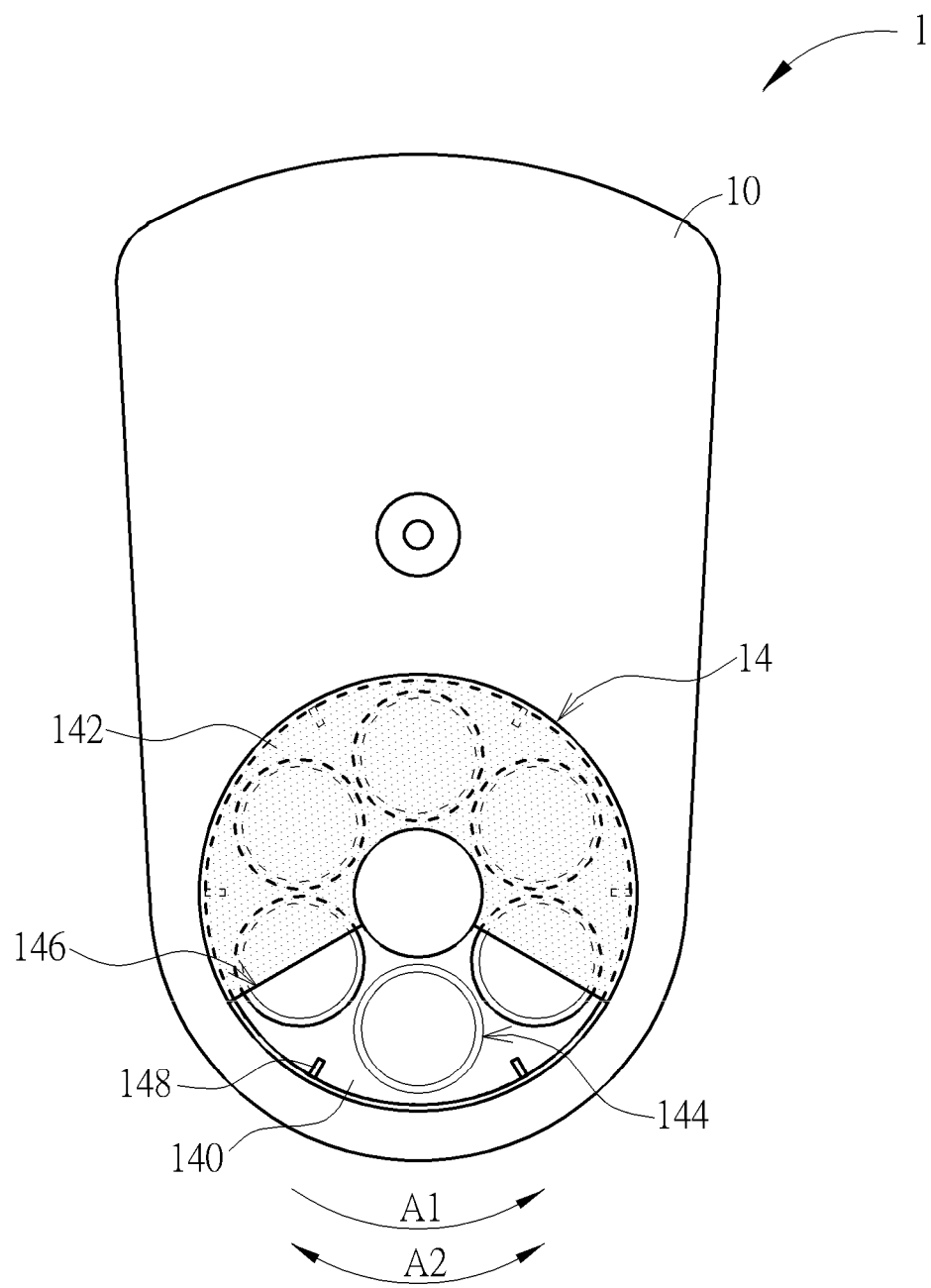
FIG. 2 is a bottom view illustrating the handheld operation device shown in FIG. 1.
Figure 3:
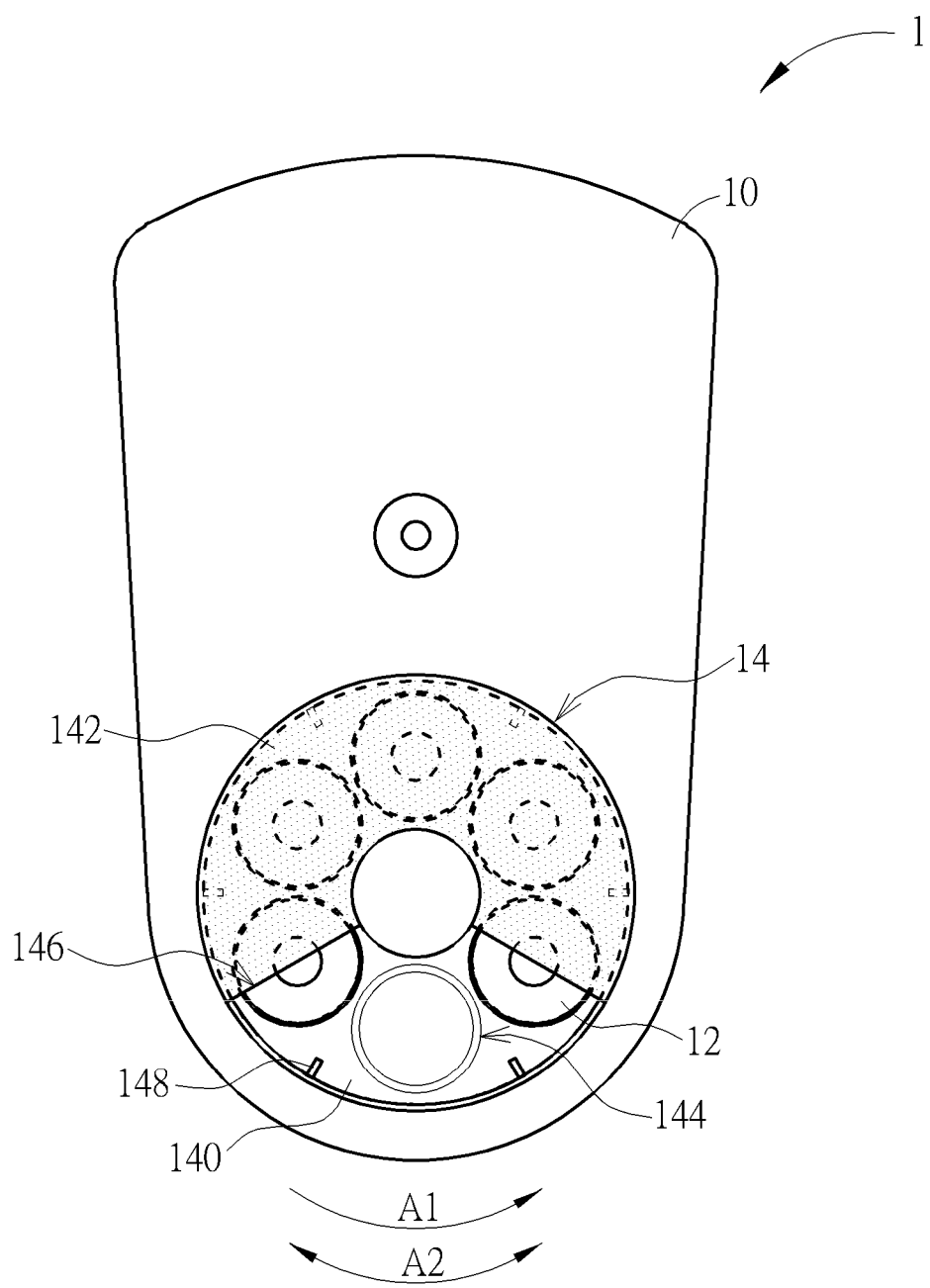
FIG. 3 is a schematic diagram illustrating the counterweight blocks placed into the accommodating recesses correspondingly.

Referring to FIGS. 1 to 3, FIG. 1 is a schematic diagram illustrating a handheld operation device 1 according to a first embodiment of the invention, FIG. 2 is a bottom view illustrating the handheld operation device 1 shown in FIG. 1, and FIG. 3 is a schematic diagram illustrating the counterweight blocks 12 placed into the accommodating recesses 144 correspondingly. The handheld operation device 1 of the invention may be a mouse, joystick, mobile phone, personal digital assistant, flat computer, or other devices capable of being held by a user to perform operation. A mouse is illustrated in FIGS. 1 to 3 as an example for depicting the features of the invention.

As shown in FIGS. 1 to 3, the handheld operation device 1 comprises a casing 10, a plurality of counterweight blocks 12 and a counterweight module 14. The counterweight module 14 is disposed on the casing 10, wherein the counterweight module 14 comprises a base 140 and a block plate 142. The block plate 142 covers the base 140. In this embodiment, the base 140 is capable of rotating with respect to the casing 10 and the block plate 142 is immovable. However, in another embodiment, the block plate 142 may be capable of rotating with respect to the casing 10 and the base 140 may be immovable correspondingly. In other words, as long as one of the base 140 and the block plate 142 is capable of rotating with respect to the casing 10, the invention can be implemented. In practical applications, one of the base 140 and the block plate 142 may be pivotally connected to the casing 10 by an axle (not shown) such that one of the base 140 and the block plate 142 is capable of rotating with respect to the casing 10.

The base 140 has a plurality of accommodating recesses 144, the block plate 142 has a broken hole 146 formed thereon, and one of the accommodating recesses 144 is exposed in the broken hole 146 such that one of the counterweight blocks 12 is capable of passing through the broken hole 146 and then being disposed in the accommodating recess 144. Accordingly, a user can place the counterweight block 12 into the accommodating recess 144 of the base 140 via the broken hole 146 of the block plate 142, so as to change the weight and the center-of-gravity position of the handheld operation device 1.

In this embodiment, the accommodating recesses 144 may be, but not limited to, distributed symmetrically. It should be noted that the numbers of the accommodating recesses 144 and the counterweight blocks 12 can be determined according to practical applications and are not limited to the embodiment shown in FIGS. 1 and 3. Moreover, a shape of the counterweight block 12 matches that of the accommodating recess 144. For example, the shapes of the counterweight block 12 and the accommodating recess 144 may be circular (as shown in FIGS. 1 to 3), rectangular, star-shaped or other shapes.

If the base 140 is capable of rotating with respect to the casing 10, a protruding portion 148 is disposed between every two of the accommodating recesses 144 and used for rotating the base 140, as shown in FIGS. 2 and 3. The user can push the protruding portion 148 by a finger to rotate the base 140 in a direction indicated by an arrow A1 or A2, such that one of the accommodating recesses 144 is exposed in the broken hole 146. Accordingly, the user can place/take the counterweight block 12 into/out of the accommodating recess 144 of the base 140 via the broken hole 146 of the block plate 142. As shown in FIGS. 2 and 3, the block plate 142 may be transparent such that the user can see how many and where the counterweight blocks 12 are disposed in the base 140. Needless to say, the block plate 142 may be also opaque according to practical applications.

After the counterweight block 12 is disposed in the accommodating recess 144, the user can push the protruding portion 148 by a finger to rotate the base 140 in the direction indicated by the arrow A1 or A2, such that the block plate 142 covers the counterweight block 12, as shown in FIG. 3. Accordingly, the block plate 142 can prevent the counterweight block 12 from coming off the accommodating recess 144. Still further, the counterweight block 12 may be also disposed in the accommodating recess 144 in a tight-fitting manner.

Figure 4:
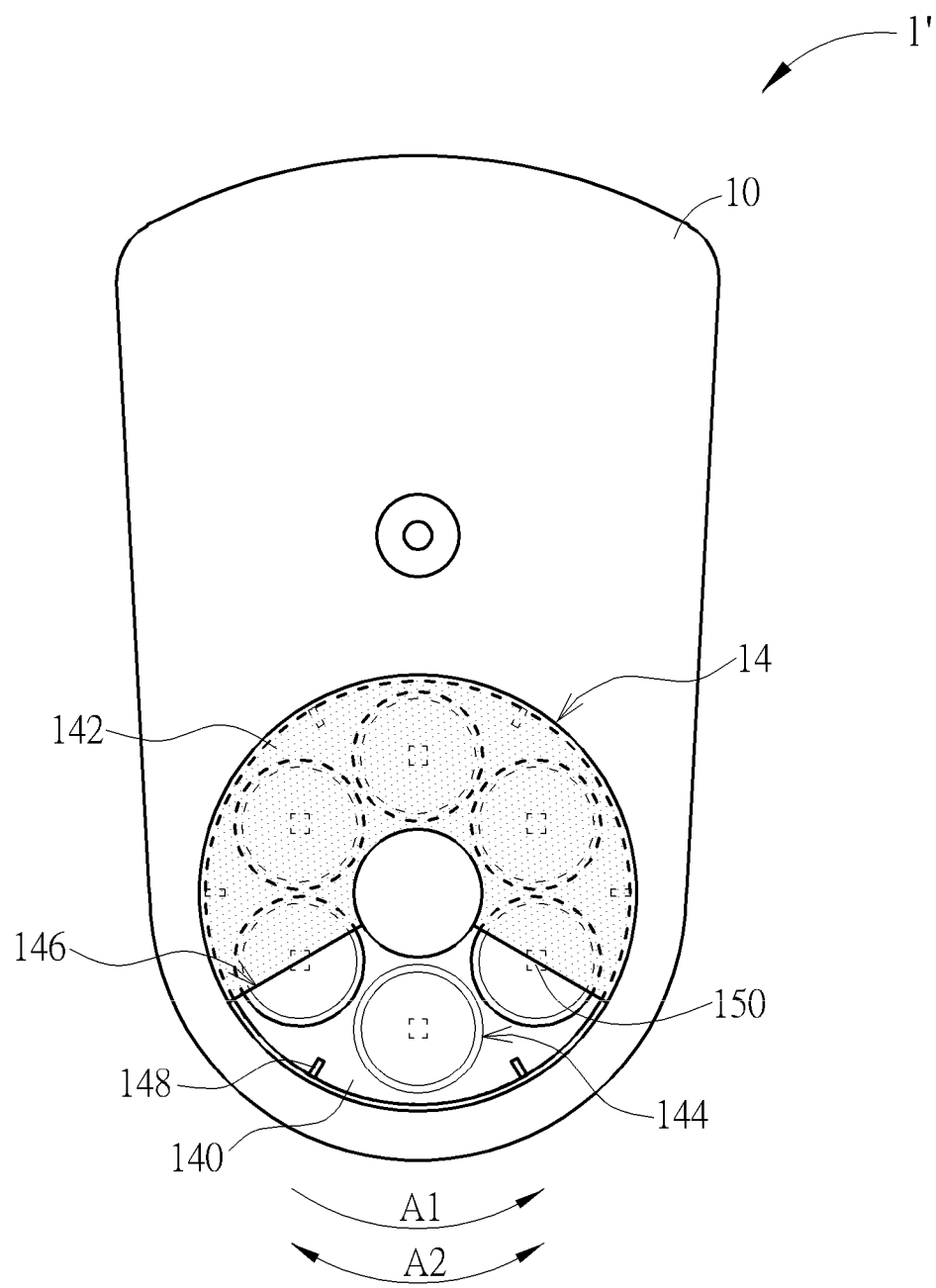
FIG. 4 is a bottom view illustrating a handheld operation device according to a second embodiment of the invention.

Referring to FIG. 4 along with FIG. 2, FIG. 4 is a bottom view illustrating a handheld operation device 1' according to a second embodiment of the invention. The difference between the handheld operation device 1' and the aforesaid handheld operation device 1 is that a magnet 150 is disposed in each of the accommodating recesses 144 of the handheld operation device 1' and used for attracting the counterweight block 12. In this embodiment, the counterweight blocks 12 may be made of aluminum, copper, iron or other metal materials. Accordingly, when the counterweight block 12 is disposed in the accommodating recess 144, the magnet 150 will attract the counterweight block 12 so as to prevent the counterweight block 12 from coming off the accommodating recess 144. It should be noted that the invention may also utilize other engaging structures (e.g. hook) to fasten the counterweight block 12 in the accommodating recess 144, so as to prevent the counterweight block 12 from coming off the accommodating recess 144.

As mentioned in the above, the invention installs the counterweight module on the casing of the handheld operation device such that a user can place/take the counterweight block into/out of the accommodating recess of the base via the broken hole of the block plate, so as to change the weight and the center-of-gravity position of the handheld operation device. Furthermore, the user can rotate the base or the block plate to place more counterweight blocks into more accommodating recesses correspondingly, so as to increase the weight of the handheld operation device and further change the center-of-gravity position of the handheld operation device. Accordingly, the user can change the weight and the center-of-gravity position of the handheld operation device according to his/her using habit by the cooperation between the counterweight blocks and the counterweight module.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A handheld operation device comprising:
   a casing;
   a plurality of counterweight blocks; and
   a counterweight module disposed on the casing, the counterweight module comprising a base and a block plate, the block plate covering the base, one of the base and the block plate being capable of rotating with respect to the casing, the base having a plurality of accommodating recesses, the block plate having a broken hole formed thereon, one of the accommodating recesses being exposed in the broken hole such that one of the counterweight blocks is capable of passing through the broken hole and then being disposed in the accommodating recess.

2. The handheld operation device of claim 1, wherein the accommodating recesses are distributed symmetrically.

3. The handheld operation device of claim 1, wherein a shape of the counterweight block matches that of the accommodating recess.

4. The handheld operation device of claim 1, wherein the block plate is transparent.

5. The handheld operation device of claim 1, wherein if the base is capable of rotating with respect to the casing, a protruding portion is disposed between every two of the accommodating recesses and used for rotating the base.

6. The handheld operation device of claim 1, wherein the counterweight block is disposed in the accommodating recess in a tight-fitting manner.

7. The handheld operation device of claim 1, wherein a magnet is disposed in each of the accommodating recesses and used for attracting the counterweight block.

* * * * *